(No Model.)

T. A. EDISON.
BURNISHING ATTACHMENT FOR PHONOGRAPHS.

No. 382,414. Patented May 8, 1888.

Witnesses.

Inventor.
Thomas A. Edison
By his Attorneys
Dyer & Seely

UNITED STATES PATENT OFFICE.

THOMAS A. EDISON, OF LLEWELLYN PARK, NEW JERSEY.

BURNISHING ATTACHMENT FOR PHONOGRAPHS.

SPECIFICATION forming part of Letters Patent No. 382,414, dated May 8, 1888.

Application filed November 26, 1887. Serial No. 256,190. (No model.)

*To all whom it may concern:*

Be it known that I, THOMAS A. EDISON, of Llewellyn Park, in the county of Essex and State of New Jersey, have invented a certain new and useful Improvement in Phonographs, (Case No. 742,) of which the following is a specification.

The object I have in view is to improve the articulation of the phonograph. This I find can be accomplished by burnishing with a heated burnishing-tool the wax or wax-like surface of the phonogram-blank. The effect is to smooth out the tool-marks produced in turning the surface to a true cylinder, and to reduce greatly the scratching noise heard in the recorder, and consequently made a part of the record which is reproduced by the reproducer.

I provide the phonograph itself with the heated burnishing-tool as well as with the cutting-tool, the former acting after the latter upon the surface. Both tools are adjustably carried by the holding-arm or guide-sleeve of the phonograph, so that they can be brought into proper relation with the surface and made to work at the same time upon it. The burnishing-tool may be a piece of platinum wire heated by the electric current, or it may be a piece of wire which is heated by a small alcohol-lamp and conducts the heat to the burnishing-point of the tool.

Figure 1:
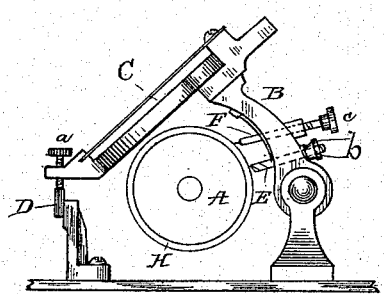
Figure 2:
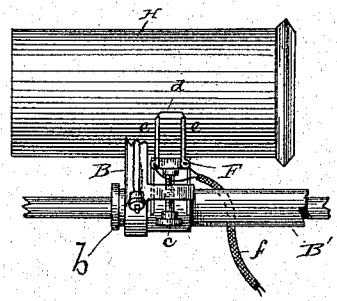
Figure 3:
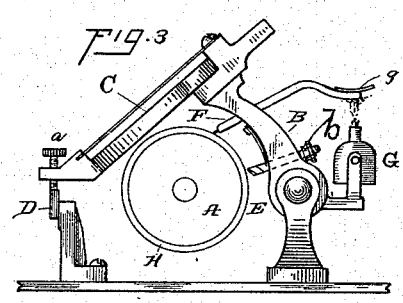

In the accompanying drawings, forming a part hereof, Figure 1 is an end elevation of the phonogram-cylinder and phonogram-blank with the holding-arm and the cutting and burnishing tools carried thereby; Fig. 2, a top view with the holding-arm broken away; Fig. 3, a view similar to Fig. 1, showing a modified form of the heated burnishing-tool; and Fig. 4, a view similar to Fig. 2, showing the modified form of burnishing-tool.

A is the revolving phonogram-cylinder.

B is the traveling holding-arm mounted on the guide-sleeve B' and carrying the recorder and reproducer, the arm and sleeve being fed laterally by a lead-screw on the shaft of the phonogram-cylinder, as will be well understood. The frame C, carried by the arm B, rests upon the guide-rest D, it being adjustably supported thereon by a set-screw, *a*.

Through the arm B passes the shank of the cutting-tool E, adjustable by means of the nut *b*. There is also carried by an extension on the arm B the heated burnishing-tool F. This is adjustable by means of the screw *c*, and acts upon the phonogram-blank surface after the cutting-tool.

In Figs. 1 and 2 the burnishing-tool is composed of a platinum strip or wire, *d*, to which heavier wires or rods *e* lead. The rods *e* are connected by a flexible cord, *f*, with a battery for supplying current for heating the strip or wire *d*. The strip or wire *d* is heated to a dull red, and is made to bear lightly on the wax or wax-like surface of the phonogram-blank.

Figure 4:
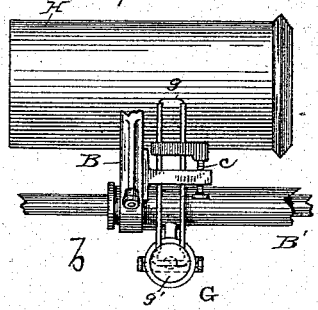

In Figs. 3 and 4 the heat is produced by a small alcohol-lamp, G, which is carried by the guide-sleeve B' and travels with the holding-arm. The burnishing-tool in this latter arrangement may be a silver or aluminium wire, *g*—say one-eighth of an inch in diameter and reduced to one thirty-second of an inch at its burnishing end, such end being heated by conduction from the lamp. The end of the wire *g* above the flame of the lamp may carry a plate, *g'*, so that the tool can be adjusted without disturbing the influence of the lamp. The wire, except at the flame and the burnishing end, may be covered by a poor conductor of heat, such as asbestos.

The phonogram-blank H is a cylinder slipping over the phonogram-cylinder A. It has a surface of wax or a wax-like material on a base of harder material—such as plaster-of-paris. The phonogram-blank may be turned and burnished before being placed on the phonogram-cylinder of the phonograph; but it is preferred to have the cutting and burnishing tools upon the phonograph itself, since the phonogram-blank can then be turned true to the cylinder of the machine, and can have the record removed from its surface, so that the phonogram-blank can be used over again repeatedly.

I do not claim in this application the process of preparing the wax surface of a phonogram-blank by burnishing the same, or first cutting and then burnishing the same, since I propose to file a separate application for patent upon such process. Nor do I claim herein a phonogram-blank having a recording-surface of wax or a wax-like material, or having such a surface and a backing of tougher material, since this is covered by my application for Patent No. 734, Serial No. 252,964; neither do I claim herein such a phonogram-blank when the base is of a molded material—such as plaster-of-paris—since this is covered by my application No. 740, Serial No. 256,188; neither do I claim herein a phonogram-blank having a burnished wax or wax-like surface, since this will be made the subject of a separate application for patent.

What I claim is—

1. In a phonograph, the combination, with the phonogram-blank carrier adapted to carry a wax-surfaced blank, of a burnishing-tool mounted upon the machine in position to act on the wax surface of the blank, substantially as set forth.

2. In a phonograph, the combination, with the phonogram-blank carrier adapted to carry a wax-surfaced blank, of a heated burnishing-tool mounted upon the machine in position to act on the wax surface of the blank, substantially as set forth.

3. In a phonograph, the combination, with the phonogram-blank carrier adapted to carry a wax-surfaced blank, of a cutting-tool and a burnishing-tool mounted upon the machine in position to act in succession on the wax surface of the blank, substantially as set forth.

4. In a phonograph, the combination, with the revolving phonogram-cylinder and the traveling holding-arm, of the cutting-tool and the heated burnishing-tool moving with such traveling holding-arm, substantially as set forth.

5. In a phonograph, the combination, with the phonogram-blank carrier adapted to carry a wax-surfaced blank, of a burnishing-tool mounted upon the machine in position to act on the wax surface, and electric-circuit connections for heating the tool by an electric current, substantially as set forth.

This specification signed and witnessed this 22d day of November 1887.

THOS. A. EDISON.

Witnesses:
WILLIAM PELZER,
E. C. ROWLAND.